United States Patent
Achterberg et al.

[15] 3,691,618
[45] Sept. 19, 1972

[54] AUTOMATIC INSERT ASSEMBLY MACHINE AND METHOD EMPLOYING DEFORMATION AND LINEAR TRANSFER OF WORKPIECES

[72] Inventors: Raymond C. Achterberg; Charles L. Bunker, both of Janesville, Wis.

[73] Assignee: Giddings &. Lewis, Inc., Fond du Lac, Wis.

[22] Filed: Jan. 19, 1971

[21] Appl. No.: 107,806

[52] U.S. Cl............29/430, 29/156.8 FC, 29/208 D, 29/211 D
[51] Int. Cl.......B23p 19/00, B23p 15/02, B23q 7/10
[58] Field of Search....29/211 D, 430, 156.8 FC, 208 D, 29/429

[56] References Cited

UNITED STATES PATENTS

| | | | |
|---|---|---|---|
| 2,142,109 | 1/1939 | Burke | 29/430 |
| 3,316,622 | 5/1967 | Jandasek | 29/156.8 FC |
| 3,522,645 | 8/1970 | Kennicott | 29/211 D |

Primary Examiner—Thomas H. Eager
Attorney—Wolfe, Hubbard, Leydig, Voit & Osann

[57] ABSTRACT

An assembly machine and method are provided for automatically inserting and fixing blade-like foil inserts in a torque converter turbine drum or similar article. The assembly mechanism includes automatic apparatus for accomplishing the requisite assembly motions, including moving a turbine drum which is placed upon a translatable rack to a preliminary position, moving the drum from the rack to a work position upon a supporting mandrel, stripping a foil insert from a feeding magazine, forcing the stripped insert along U-shaped guides to temporarily and resiliently cup or temporarily spring the end of the insert for insertion into the drum, inserting a first foil ear into the drum, thereby locating the foil in a preliminary position, hammering the foil into its final assembled position in the drum, angularly indexing the drum or housing to a successive position so as to receive the next blade-like foil insert, counting the number of angular indexing steps imparted to the drum, and moving the drum with its assembled blade-like foil inserts back to the rack and then out of the assembly mechanism when the requisite number of foils have been inserted.

17 Claims, 28 Drawing Figures

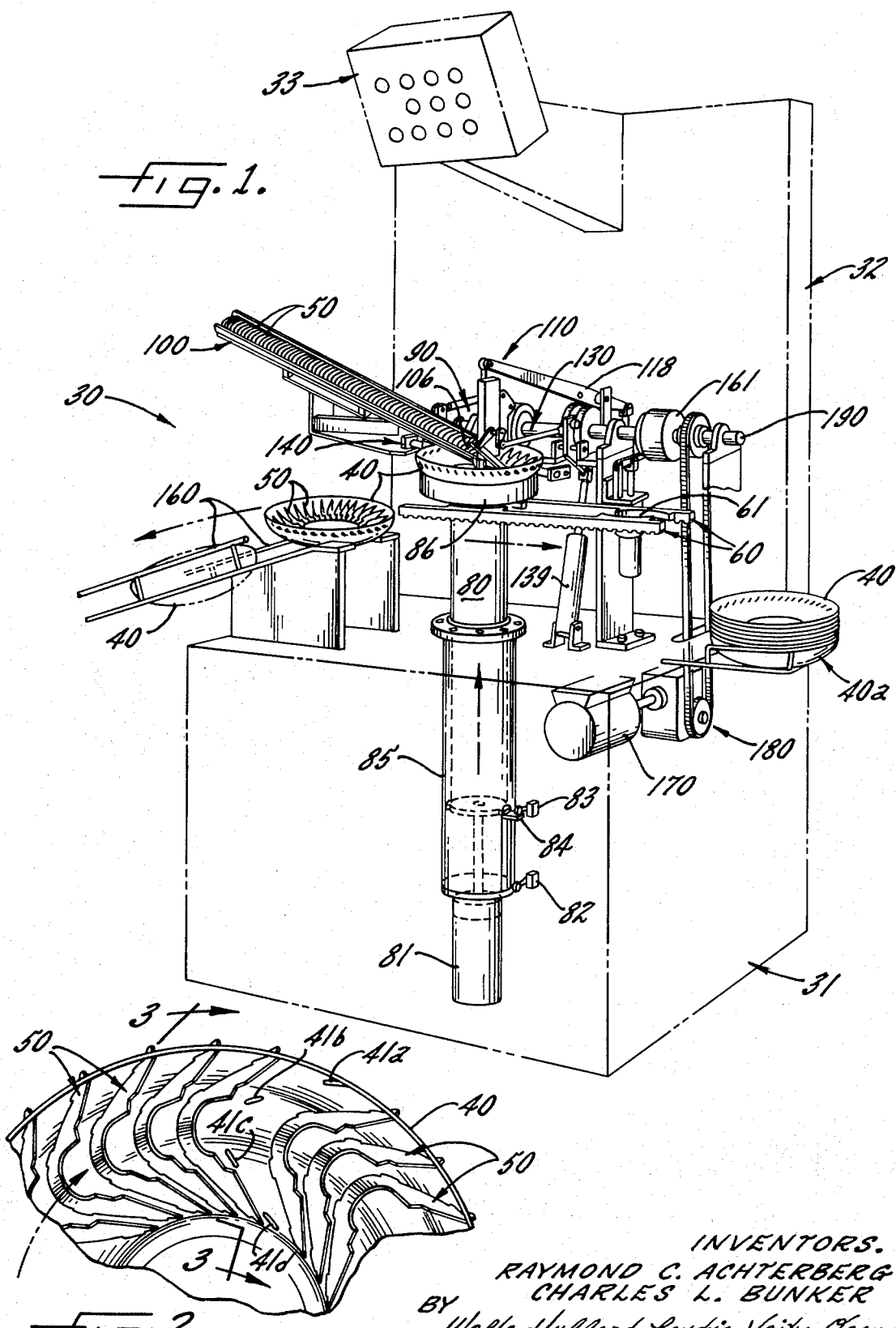

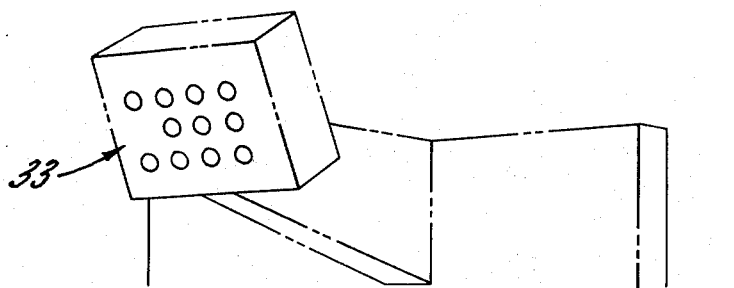
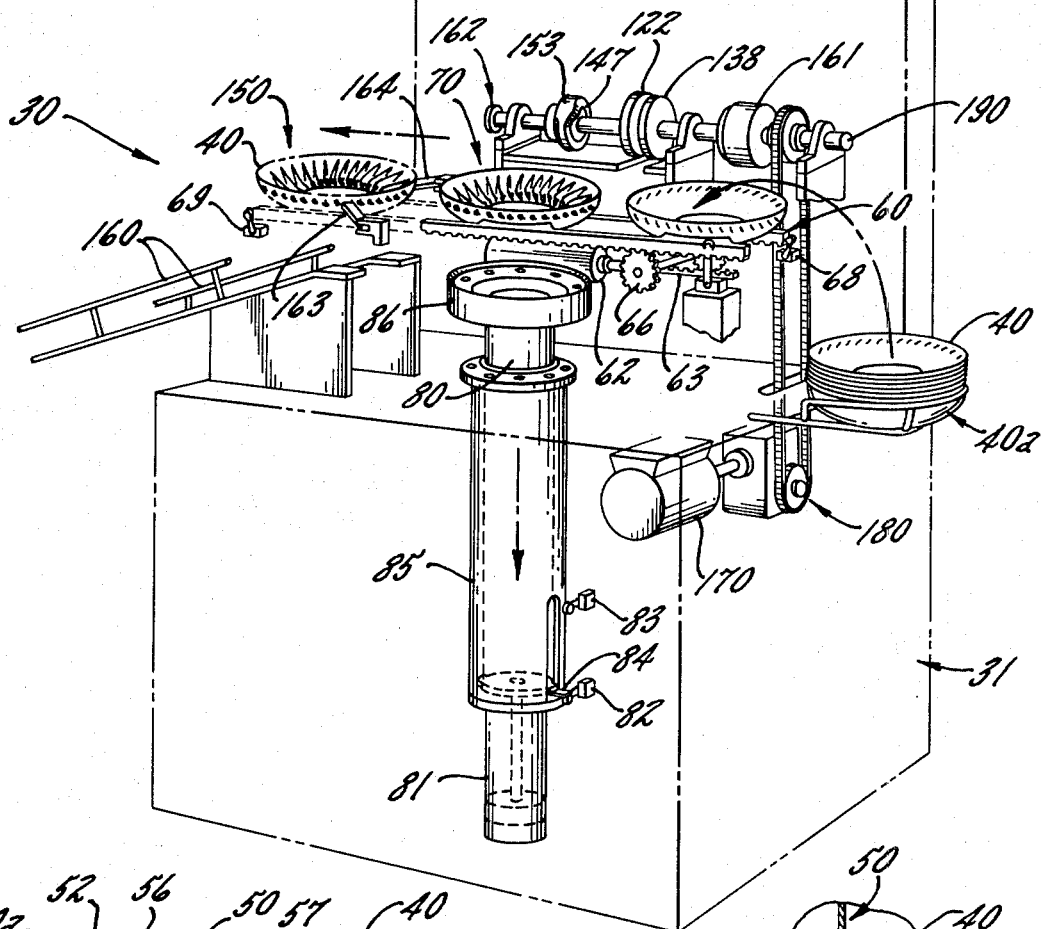
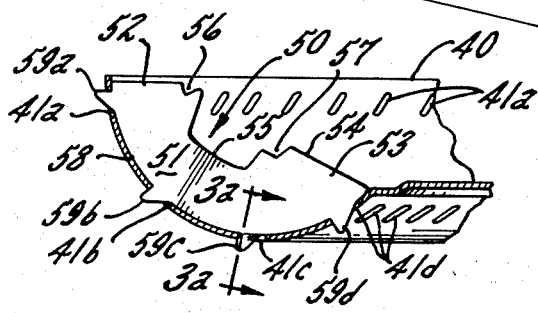

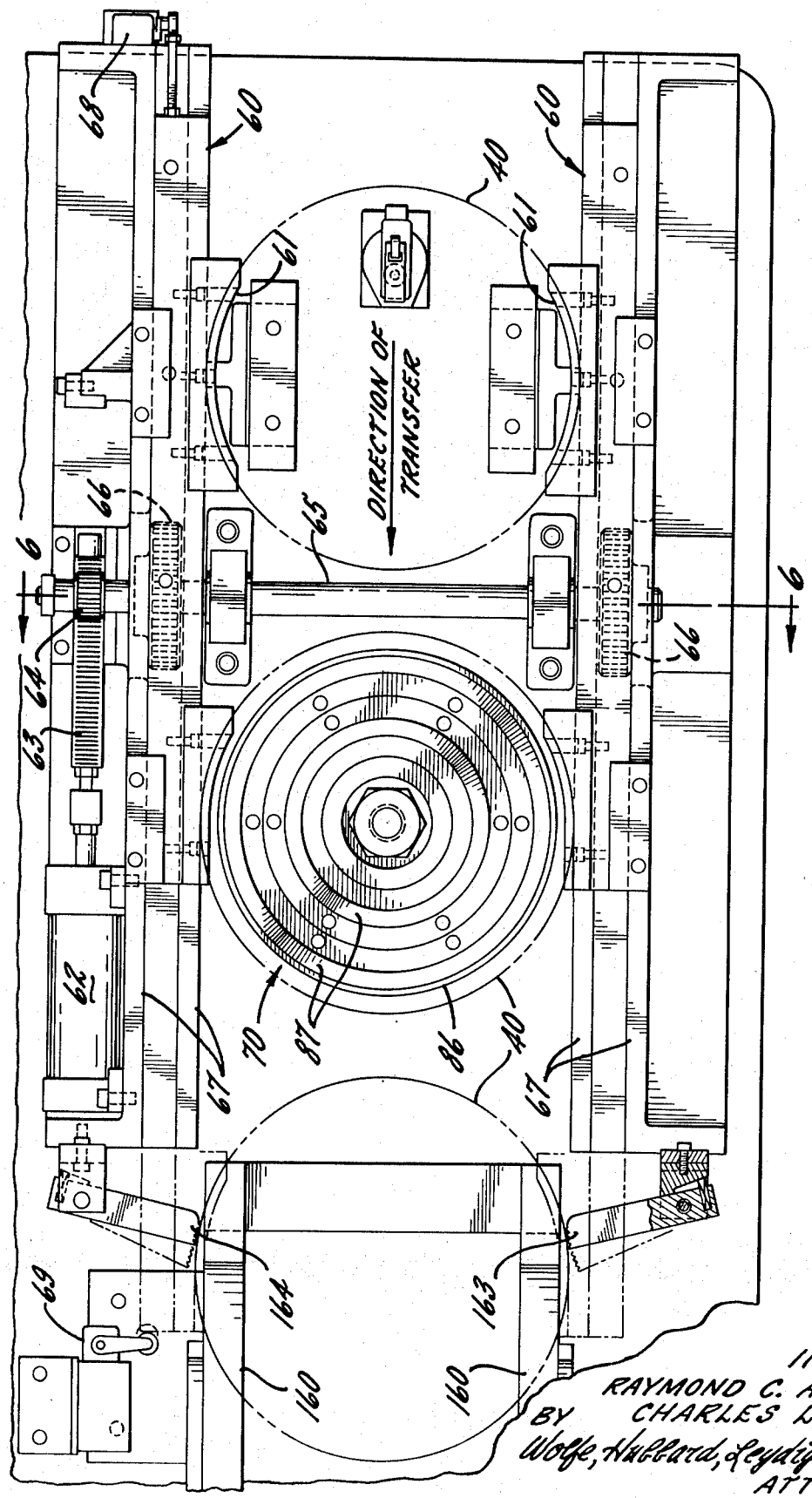

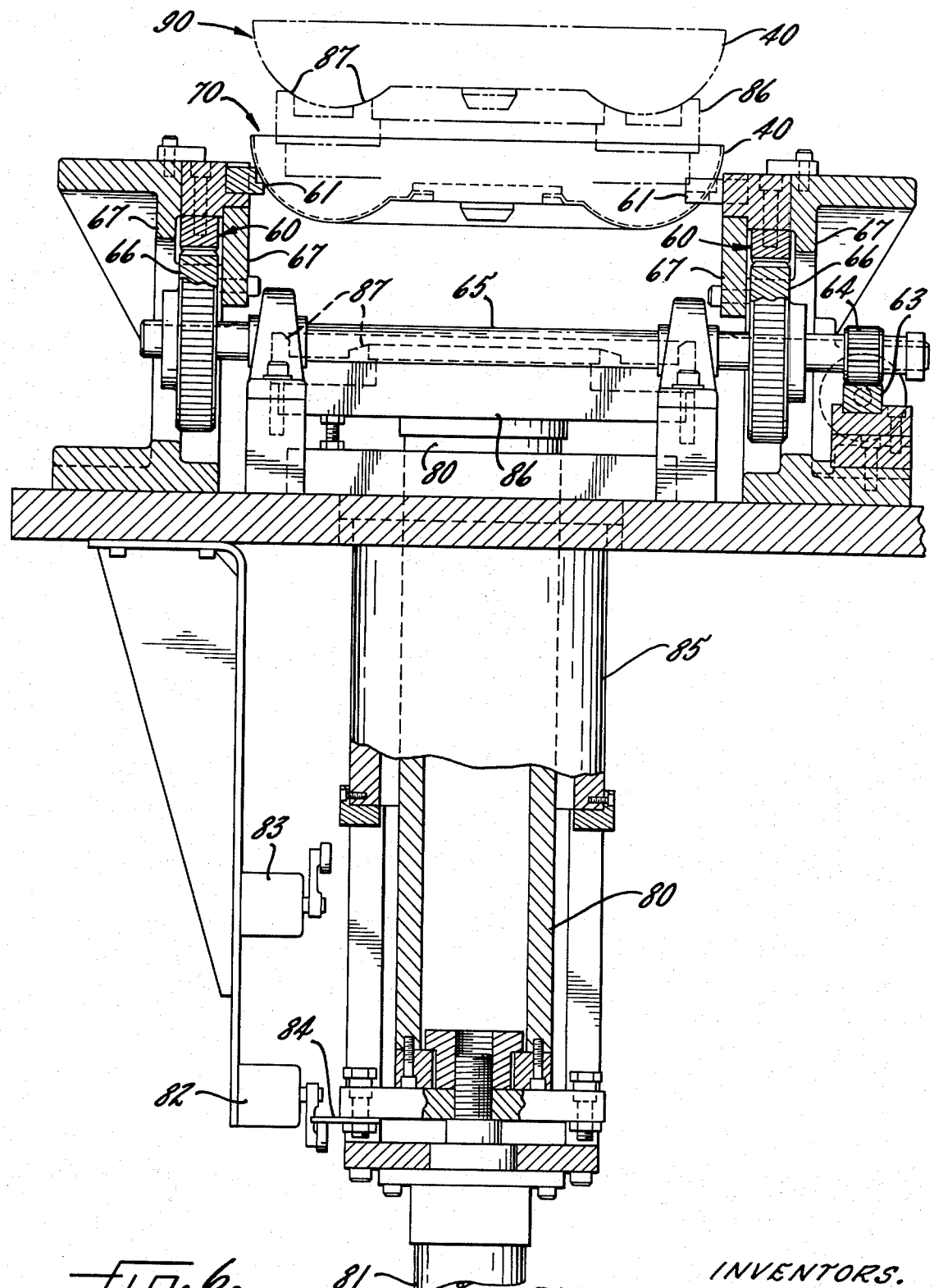

INVENTORS.
RAYMOND C. ACHTERBERG
CHARLES L. BUNKER
BY Wolfe, Hubbard, Leydig, Voit & Osann
ATTORNEYS.

INVENTORS.
RAYMOND C. ACHTERBERG
CHARLES L. BUNKER
BY Wolfe, Hubbard, Leydig, Voit & Osann
ATTORNEYS.

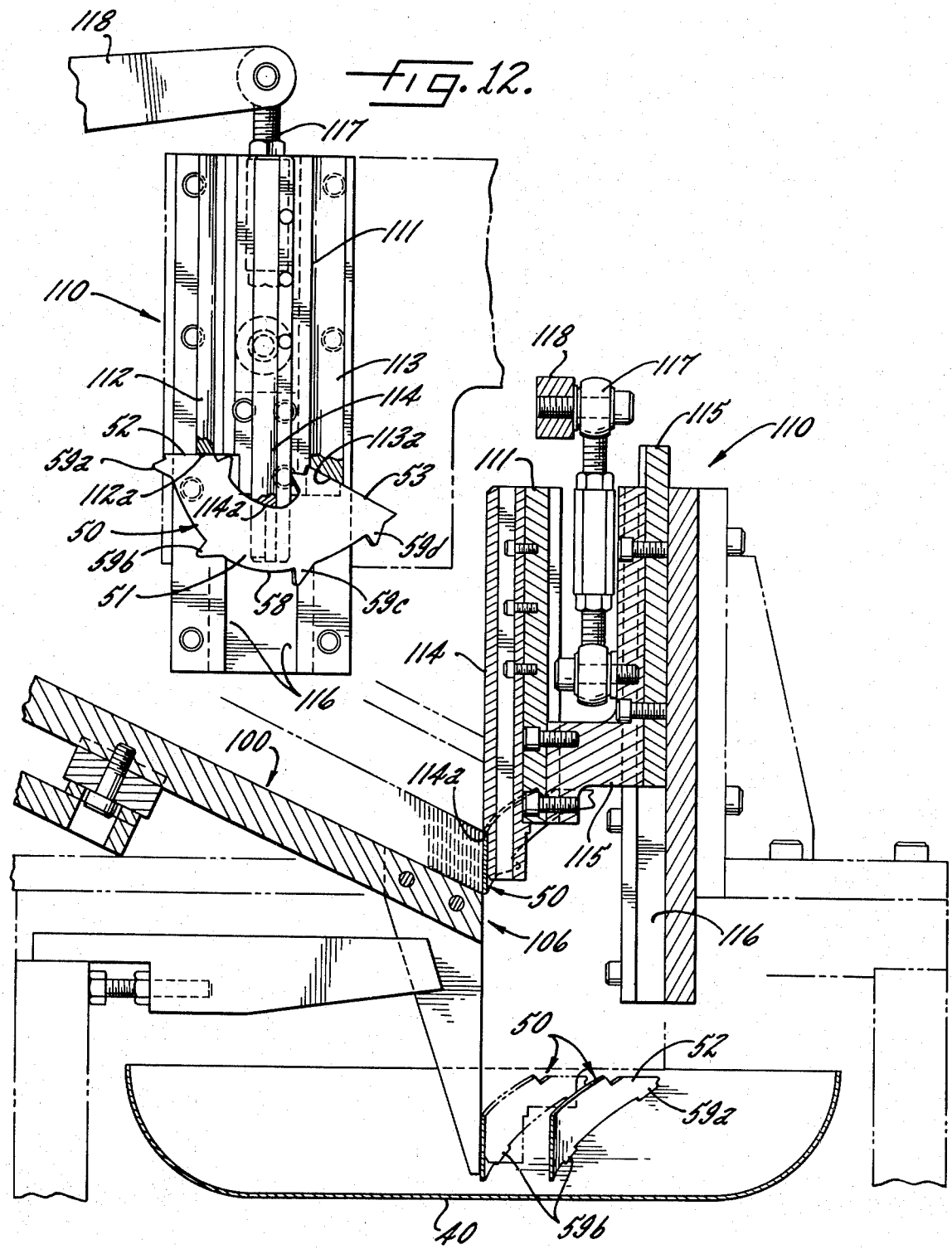

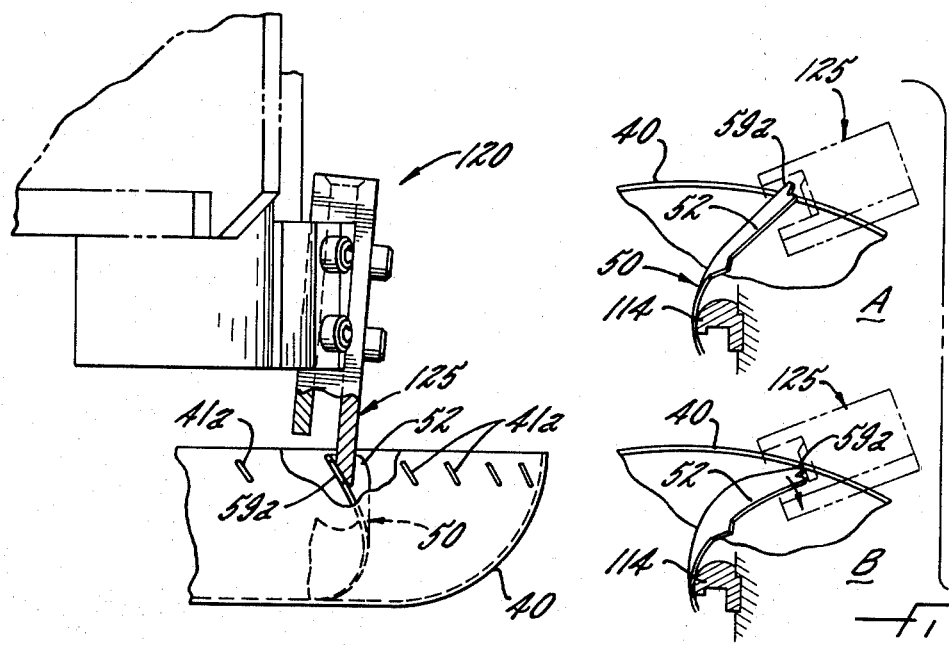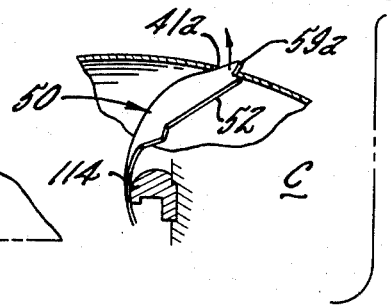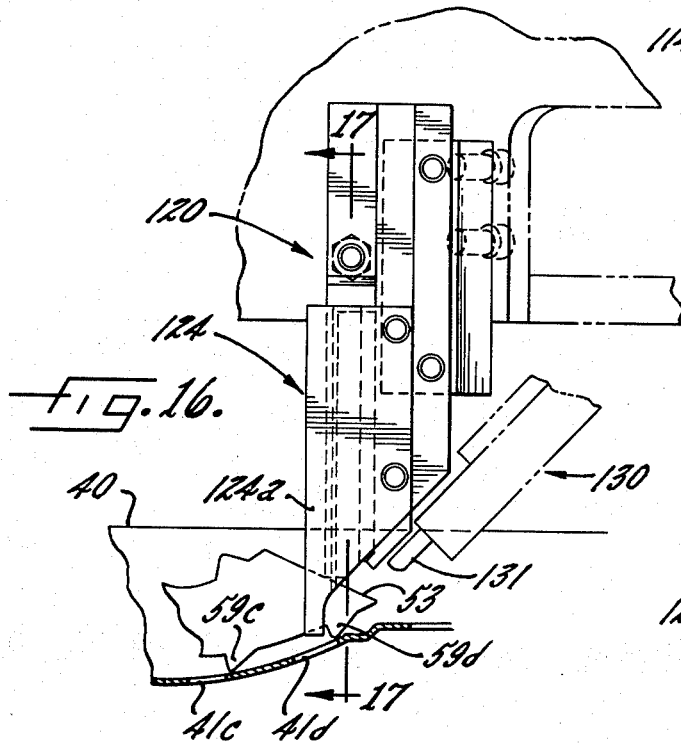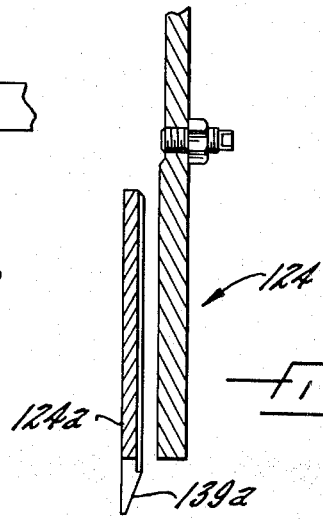

INVENTORS.
RAYMOND C. ACHTERBERG
CHARLES L. BUNKER
BY Wolfe, Hubbard, Leydig, Voit & Osann
ATTORNEYS.

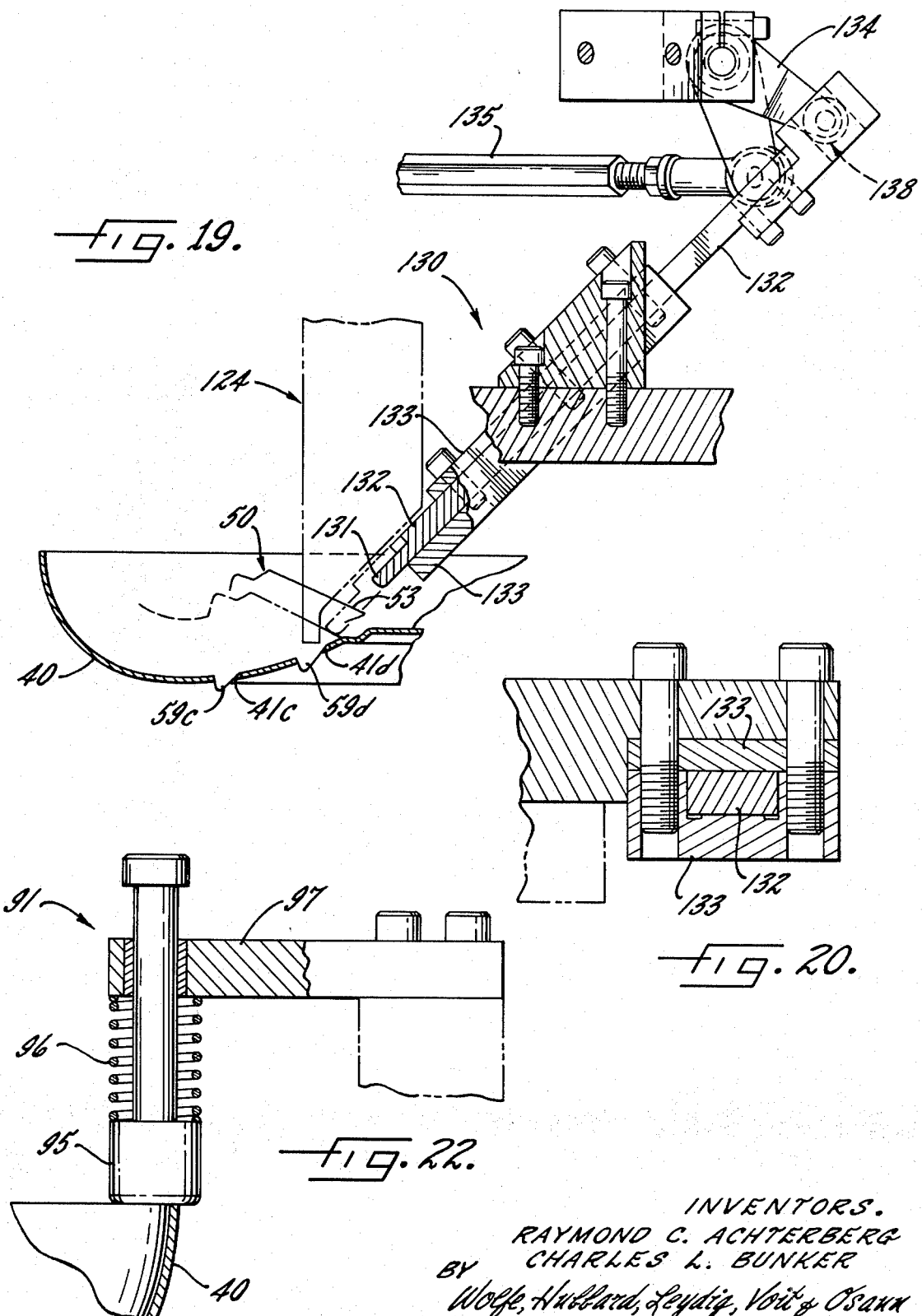

INVENTORS.
RAYMOND C. ACHTERBERG
CHARLES L. BUNKER
BY
Wolfe, Hubbard, Leydig, Voit & Osann
ATTORNEYS.

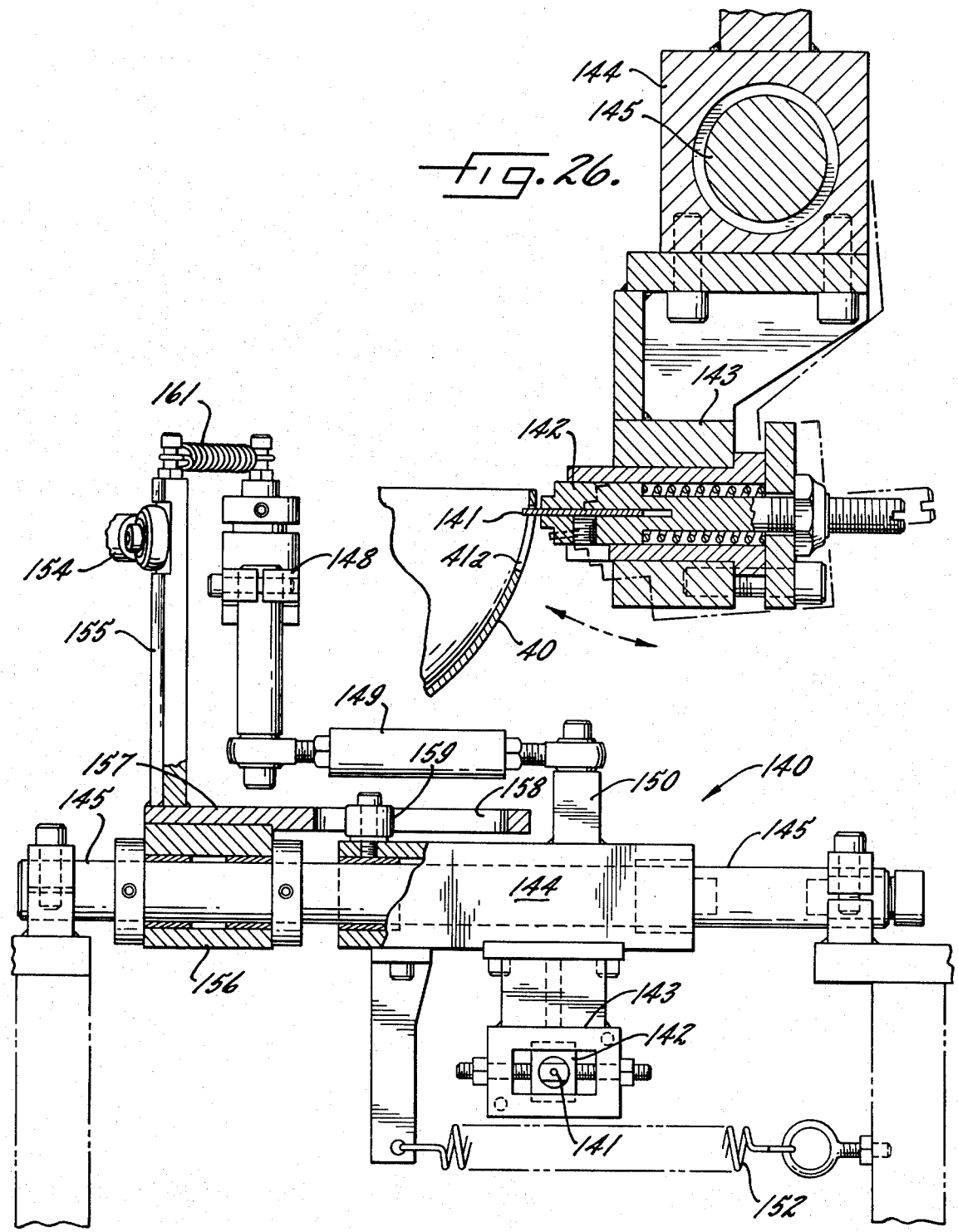

AUTOMATIC INSERT ASSEMBLY MACHINE AND METHOD EMPLOYING DEFORMATION AND LINEAR TRANSFER OF WORKPIECES

RELATED APPLICATION

Raymond C. Achterberg, Ser. No. 73,068, filed on Sept. 17, 1970, and assigned to Giddings & Lewis, Inc., assignor herein.

BACKGROUND OF THE INVENTION

The present invention relates generally to article handling apparatus and, more particularly, to an automatic system for assembling inserts—particularly, curvilinear foil inserts—in a turbine drum or the like.

Torque converter assemblies for use in automobile transmissions and similar applications have long presented assembly problems for torque converter manufacturers. Such torque converters generally include dish-like turbine drums, each resembling the outer half shell of a toroid centrally split in a plane perpendicular to the toroid centerline or axis. A ring of turbine foils is assembled within this drum for imparting or receiving fluid pressure in response to other parts of the torque converter. Complex turbines are provided with foils which may be curved in up to three planes and which may be secured within the curved turbine at non-radial positions.

A particularly difficult assembly problem arises when inserting the last of thirty or more of such turbine foils into the last unfilled assembly position in the drum, or into an assembly position between two previously inserted or assembled foils located in immediately adjacent assembly positions, since relatively small amounts of work space are available for maneuvering the foil and associated assembly tools. The problem may be compounded if in order to retain the foil in its final assembled position, ears formed on the foil must be inserted into corresponding slots formed in the drum as the foil moves into its final assembled position along a particular approach path of movement. This path of movement provides decreasing tolerance for positional error as the final assembly position is neared by the foil. Thus, both the foil and the foil inserting work tools must move precisely along given paths into and out of the confined work space.

Another difficult assembly problem arises in fitting the foil ears into their final position within the drum slots. When some angles of foil-ear-to-drum-side intersection are encountered, it may be advantageous to temporarily resiliently deform the foil as it is preliminarily positioned in the drum, and thereafter to snap the foil into its final position in the drum by a mechanical blow.

Recently, assemblers such as those disclosed in Kennicott U.S. Pat. No. 3,522,645, issued Aug. 4, 1970, and the aforesaid Achterberg application have presented methods and apparatus for assembling somewhat similar foils into somewhat similar drums.

It is an overall object of this invention to provide a method and associated automatic assembly apparatus for assembling curvilinear workpieces into a support structure at predetermined assembly positions.

It is another object to provide an automatic assembling apparatus requiring a minimum amount of slow or intricate hand work to be performed by the machine operator.

In a further aspect, the invention provides a turbine assembling apparatus which causes each prestressed curvilinear foil being inserted to be snapped positively into its final assembled position in the drum.

It is still another object to provide a reliable assembling apparatus having synchronized and positively-acting assembly mechanisms which will not become misaligned or jammed during machine operation.

It is a further object to provide a turbine assembling apparatus which is reliable and rugged in its design, yet which is relatively low in manufacturing, maintenance and operational costs.

Other objects and advantages of the invention will become apparent upon reading the following detailed description and upon reference to the drawings in which:

FIG. 1 is an overall perspective view showing the assembly system of the present invention in its general aspect;

FIG. 2 is a fragmentary plan view showing a portion of the turbine drum or similar foil support structure into which some, but not all, of the foil-like inserts have been inserted;

FIG. 3 is a partial sectional view taken substantially along the line 3—3 in FIG. 2, showing in further detail the relationship between the foil and its mounting ears and the turbine drum;

FIG. 3a is a partial sectional view taken substantially along line 3a—3a in FIG. 3 showing the location of one of the foil ears with respect to the surrounding foil structure;

FIG. 4 is a perspective view similar to FIG. 1 but here illustrating other portions of the operating mechanism;

FIG. 5 is a partial plan view of the turbine drum transfer and associated mechanism;

FIG. 6 is a sectional view taken substantially along line 6—6 of FIG. 5 showing in further detail the turbine drum transfer rack, mandrel, and other mechanisms;

FIG. 11 is a fragmentary sectional view taken substantially along line 11—11 in FIG. 10 showing the stripper mechanism, drum, and foils in further detail;

FIG. 12 is a fragmentary sectional view taken substantially along line 12—12 in FIG. 10 and showing in yet further detail the stripper mechanism;

FIG. 14 is a developed view taken substantially along line 14—14 in FIG. 10, but partially broken away, showing in further detail the drum, foil and seating mechanism;

FIG. 15 is a stop-action view showing the manner in which the fluid foil and the appended assembly ears are seated within the turbine drum;

FIG. 16 is a sectional view taken substantially along line 16—16 in FIG. 10 and showing in further detail the drum, fluid foil, stripper mechanism and loading hammer;

FIG. 17 is a partial sectional view taken substantially along line 17—17 in FIG. 16 and showing in further detail the foil positioning guide used in the assembler;

FIG. 19 is a partial sectional view taken substantially along line 19—19 in FIG. 18 and showing in further detail the drum, fluid foil and loading hammer mechanism;

FIG. 20 is a partial sectional view taken substantially along line 20—20 in FIG. 18, showing the loading hammer slide mechanism;

FIG. 22 is a partial sectional view taken substantially along line 22—22 in FIG. 18 showing in further detail the drum position retaining drag plunger;

FIG. 25 is a partial sectional view taken substantially along line 25—25 in FIG. 23 showing in further detail the turbine drum indexing mechanism;

FIG. 26 is a fragmentary sectional view taken substantially along line 26—26 in FIG. 23 and showing in yet further detail the drum indexing mechanism; and, FIG. 27 is a cam chart illustrating the relative timing of the motions of the various cam-actuated drives in the apparatus of the present invention.

While the invention will be described in connection with a preferred embodiment and procedure, it will be understood that it is not intended to limit the invention to that particular embodiment or procedure. On the contrary, it is intended to cover all alternatives, modifications and equivalents as may be included within the spirit and scope of the invention as expressed in the appended claims.

DESCRIPTION OF THE INVENTION

Figure 18:
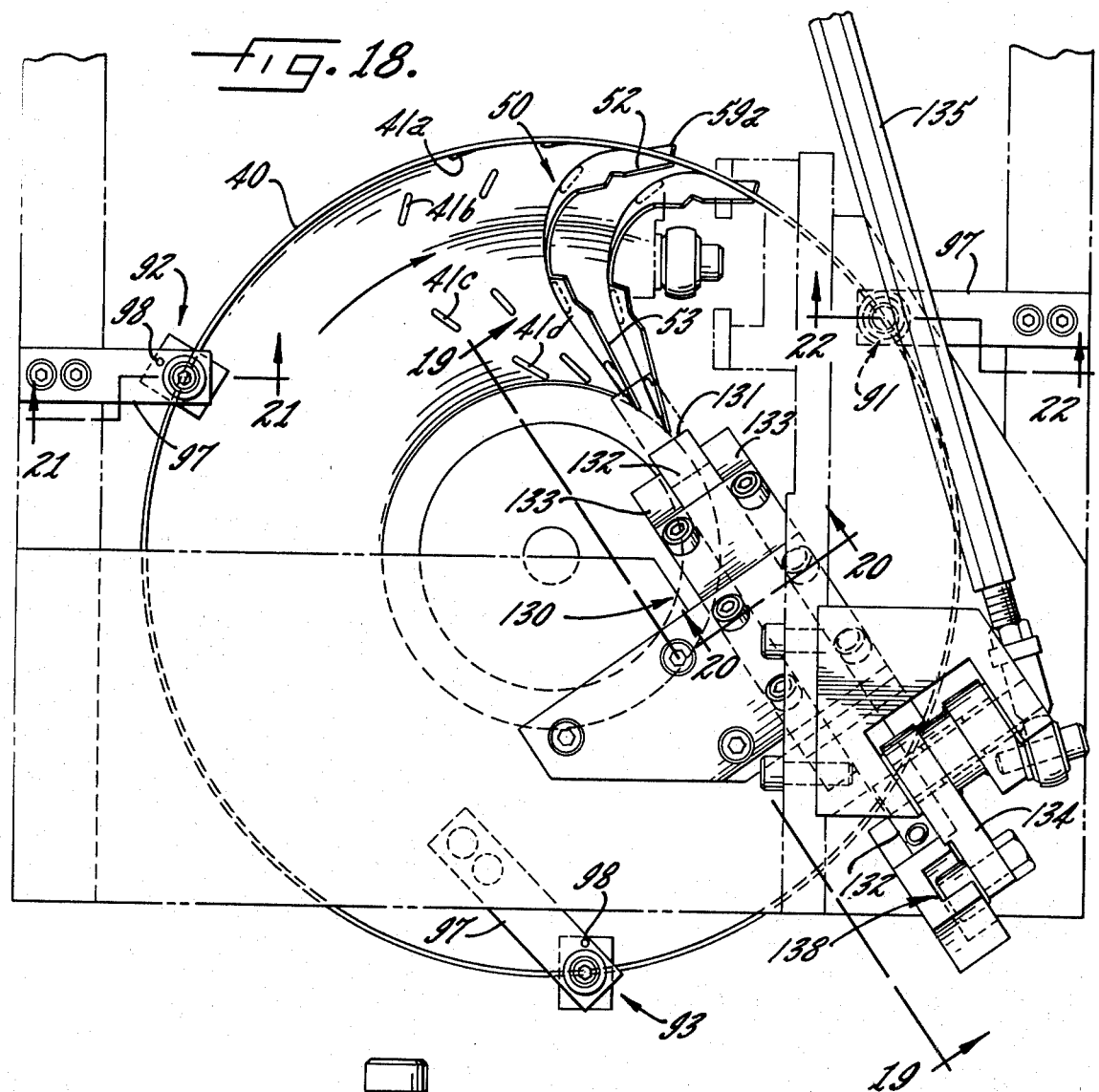
FIG. 18 is a fragmentary plan view showing in further detail the turbine drum, foils, and loading hammer mechanism.
Figure 21:
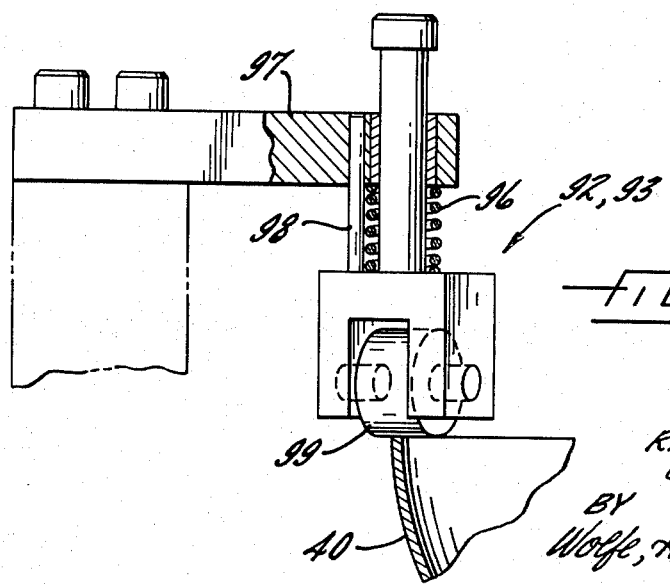
FIG. 21 is a partial sectional view taken substantially along line 21—21 in FIG. 18 showing the loading hammer slide mechanism.

Turning first to FIGS. 1 and 4, there is shown an assembler machine 30 consisting in general of a base portion 31 and an upright portion 32, to which a control panel 33 is attached. In operation, a workpiece such as a turbine drum 40 to be filled with foils 50 is manually transferred by the operator from a stack to a translatable rack 60 for movement into a preliminary position 70. A mandrel 80 is telescoped or moved axially upward to engage the bottom of the drum 40 and move it into a work position 90. The foils 50, which are stacked in a magazine 100, are stripped therefrom by a stripper mechanism 110 and forced toward the drum 40 along stripper guides 120 (FIGS. 14-17). After partial insertion into the drum 40 by the stripper mechanism 110, the foils 50 are hammered or snapped into their final assembly position by a hammer mechanism 130 (FIGS. 18 and 19). The stripper mechanism 110 and the hammer mechanism 130 are then withdrawn from the drum, and the drum is angularly indexed to an adjacent foil-receiving position by a drum index mechanism 140 (FIGS. 23-26). When the drum 40 has been indexed through a full revolution and a full set of foils have been installed within the drum, the mandrel 80 is withdrawn and the drum 40 is re-seated upon the translatable rack 60 for movement to an eject position 150. The fully assembled turbine drum and foil set is then dropped upon rails 160 for movement to a pickup or subsequent work station. For powering and synchronizing the above machine motions, a drive means such as a motor 170 is provided with a drive train 180 for driving a cam shaft 190 and other mechanisms.

As the ensuing description proceeds, it will become apparent that the present invention could be utilized to insert many different types of workpieces into many different types of workpiece supports. However, it has been found that the invention finds particularly advantageous, but by no means exclusive, use in inserting blade-like fluid foils—for example, turbine blades—into an annular, toroidally shaped foil support structure or drum 40.

In the illustrative form of the invention, the foils take the form of curvilinear fluid foils 50 having a general shape comprising slightly more than half of an irregular frustoconical section, as best seen in FIG. 3. Each foil 50 includes a central portion 51 and two contiguous wing portions 52 and 53. The upper or apicad edge 54 of each foil 50 defines a central channel-shaped opening 55 terminating in two generally opposed notches 56 and 57. The base edge 58 of each foil is shaped to abut the surface of the drum 40 when the foil 50 is installed therein. To insure the firm permanent attachment of each foil 50 within the drum 40, a plurality of mounting ears 59a, 59b, 59c and 59d are formed on the base edge 58 of the foil and are positioned thereon for reception in corresponding slots 41a, 41b, 41c and 41d formed in the drum 40. As shown in FIG. 2, it will be observed that the slots 41a-41d are disposed in four concentric circular arrays with the outer array having a plurality of equally spaced slots 41a corresponding in number to the number of foils to be mounted within the drum 40, and the three inner arrays respectively having like numbers of equally spaced slots 41b, 41c and 41d.

It is a feature of the invention that each foil 50 is secured within the drum 40 with a snap fit by the ears 59a–59d. To this end, the ears 59a, 59b, 59d are formed in the plane of the contiguous portions of the foil 50, while the third ear 59c is bent inwardly from the plane of the contiguous portions of the foil 50 toward the axis of the frustoconical section, as shown particularly in FIG. 3a.

For receiving the drum 40 and moving it toward the work position 90, the translatable rack 60 is provided in a manner similar to that disclosed in the aforementioned Kennicott U.S. Pat. No. 3,522,645. Before commencement of machine operation, the translatable rack 60 is located in a drum-receiving position as illustrated in FIG. 4. The machine operator obtains an empty drum 40, as from a stack 40a, and places it upon the rack 60 between two transporter pads 61, as illustrated in FIG. 5. The operator may then actuate the machine control panel 33 for automatic operation.

The drum 40 is thereupon moved by the rack 60 to a preliminary position 70. Movement of the translating rack 60 upon command of the control panel 33 is here accomplished by a power fluid cylinder 62 equipped with a piston rod terminating a toothed rack 63. Motion of the rack 63 is transmitted through a gear 64 and axle 65 to pinion gears 66 which mesh with the toothed underside of the translatable rack 60, as seen particularly in FIGS. 4-6. To insure correct linear motion of the rack 60, guide members 67 are provided.

Limit switches 68 and 69 are provided to sense the position of the rack 60 and, through appropriate circuitry, to terminate the motion of the power cylinder and the connected translatable rack 60 when the rack 60 has reached its fully-right or fully-left locations.

When the drum 40 has been translated to the left as seen in FIG. 4 to reach its preliminary position 70, and rack translational motion has been halted by means of the limit switch 69, the mandrel 80 is automatically moved from a retracted position as seen in FIG. 4 to an upper-projected position as seen in FIG. 1. The rack 60 thereafter is returned to its fully-right position in readiness to receive the next drum 40 from the stack 40a. In the form of the invention shown by way of example in FIG. 6, mandrel projection results from actuation of a fluid power cylinder 81. A fully down sensing limit switch 82 and a fully up sensing limit switch 83 are provided for engaging a finger 84 mounted on the mandrel 80 and for sensing the mandrel location to provide appropriate operation of the automatic circuitry (not shown). For guiding the mandrel 80 in its axial projection and retraction motion, a nest cylinder 85 (FIG. 6) is provided.

To engage the drum 40 and support it in its work position 90, the mandrel 80 is provided with a head 86 having an annular seat 87 (FIG. 6). As the drum 40 is forced upward from it preliminary position 70 to its work position 90, the drum 40 is thrust into engagement with a drag finger 91 and drag rollers 92 and 93 as seen in FIGS. 18-22. It is the function of this drag finger 91 to positionally hold the drum 40 on the seat 87 and to prevent the rotation of the mandrel 80 and supported drum 40 while the foils 50 are being inserted therein. The drag finger 91 comprises a foot member 95 which is mounted for resilient engagement with the top of the drum 40, as by the illustrated pin and spring arrangement 96 (FIG. 22), which may be conveniently mounted upon a support bracket 97. The drag roller devices 92 and 93 (FIG. 21) are similarly mounted for holding the drum 40 on the seat 87, but are provided with respective guide pins 98 and rollers 99 to allow easy rotation of the drum 40 upon the mandrel when the drag induced by the drag finger is overcome in a positive manner by the index mechanism 140.

When the drum 40 is positioned and secured at its work position 90, the foils 50 are stripped from a magazine 100 (FIGS. 1 and 8) and inserted into the drum 40. For carrying the stacked foils 50, the magazine 100 includes a first guide 101 for engaging one ear 59a and one wing 52, a second guide 102 for supporting the lower foil edge 58, a third guide 103 for supporting the opposite wing 53 and ear 59d, and a fourth guide 104 for supporting the upper extremity of the wing 53. These guides are mounted upon the machine superstructure by bolts 105 or other means to provide easy and rapid adjustment of the guides 101-104 so that the foils 50 will be securely supported and yet will slide easily down the magazine to the stripper mechanism 110. As best seen in FIG. 1, the exemplary magazine 100 is inclined to the vertical, thereby causing the foils 50 to move, by their own weight, to the bottom or stripping end 106 of the magazine for ultimate insertion into the drum 40. It is contemplated that the machine operator will monitor the magazine 100, and will load a new supply of foils 50 when the existing supply begins to run low.

Figure 13:
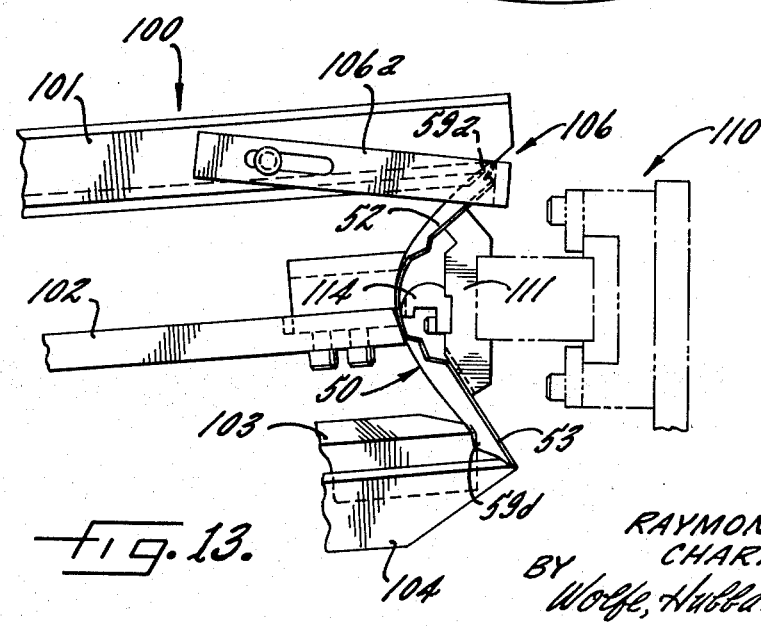
FIG. 13 is a fragmentary plan view showing in further detail the mechanism by which the forwardmost foil is retained within the foil magazine before being stripped therefrom by the stripper mechanism.

In carrying out the invention, provision is made for retaining the bottom foil 50 in the magazine 100 when the stripper mechanism 110 is not positioned adjacent the magazine end 106. To accomplish this, an adjustable hook 106a (FIG. 13) is located so as not to interfere with the motion of the stripper 110, yet at the same time is located so as to engage the bottommost foil 50 and hold it in place. To insure proper movement of each foil 50 along the foil-deforming stripper guides 120, each foil must be engaged by the stripper mechanism 110 at a plurality of locations. Thus, as best seen in FIGS. 11, 12 and 13, the stripper mechanism 110 includes a stripper block 111 provided with pads 112 and 113 for engaging the tops of the foil wings 52 and 53, respectively. An elongated and rounded engagement member 114 is carried upon the front of the stripper block 111 for engaging the central portion 51 of the foil and for providing a fulcrum about which the wings 52 and 53 of the foil may be temporarily bent or cupped. For ensuring that no more than single foil 50 is engaged for downward motion along the stripper guides 120 by the stripper block 111, the pads 112 and 113 and the engagement member 114, are provided with cutout portions 112a, 113a and 114a, respectively, such cutout portions defining foil engagement surfaces having a depth equal to the thickness of only a single foil.

Figures 8, 9:
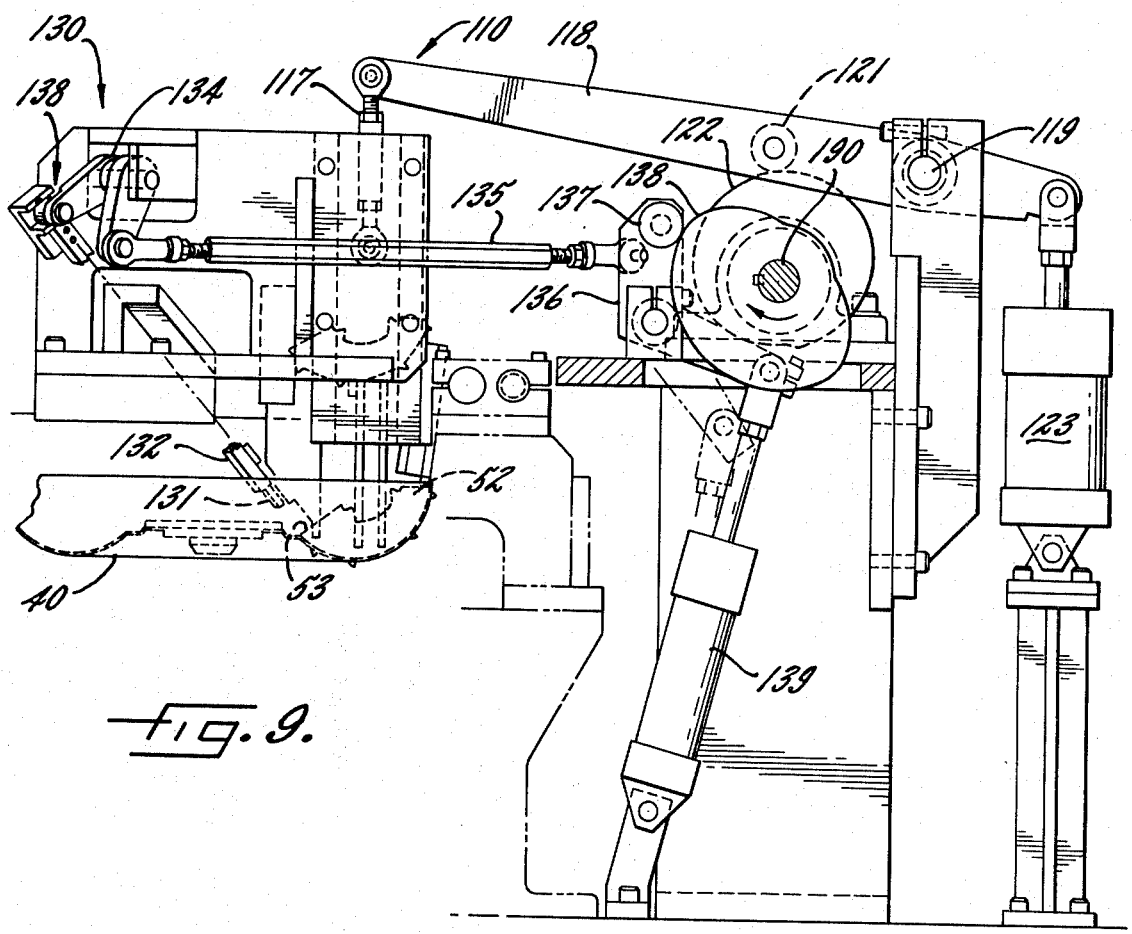
FIG. 8 is a partial sectional view taken substantially along line 8—8 of FIG. 7 showing the fluid foils supported in the assembling system magazine.
FIG. 9 is a partial sectional view taken substantially along line 9—9 in FIG. 7 showing cam linkages for the stripper and hammer mechanisms and other structure.

The stripper block 111, pads 112, 113, and member 114, together with a guide 115, are vertically moved along a pair of tracks 116 carried upon the superstructure, by an appropriately mounted connecting link 117 and a stripper lever 118 (FIGS. 9 and 11). The lever 118 is mounted for oscillatory rotation about a fixed pivot 119 on the apparatus superstructure.

For moving the foregoing linkage in a manner to withdraw the stripper mechanism upwardly, as seen in FIG. 9, a cam follower 121 mounted upon the stripper lever 118 is engaged and forced correspondingly upwardly by a cam wheel 122. Downward foil insertive motion of the stripper is caused by a biasing means 123, here illustrated as a cylinder containing a permanent charge of compressible fluid, which, upon expansion, rotates the lever 118 about the pivot 119 in a counterclockwise direction. Subsequent clockwise rotation of the lever 118 resulting from rotation of the cam 122 causes re-compression of the fluid carried in the biasing means 123.

Figure 10:
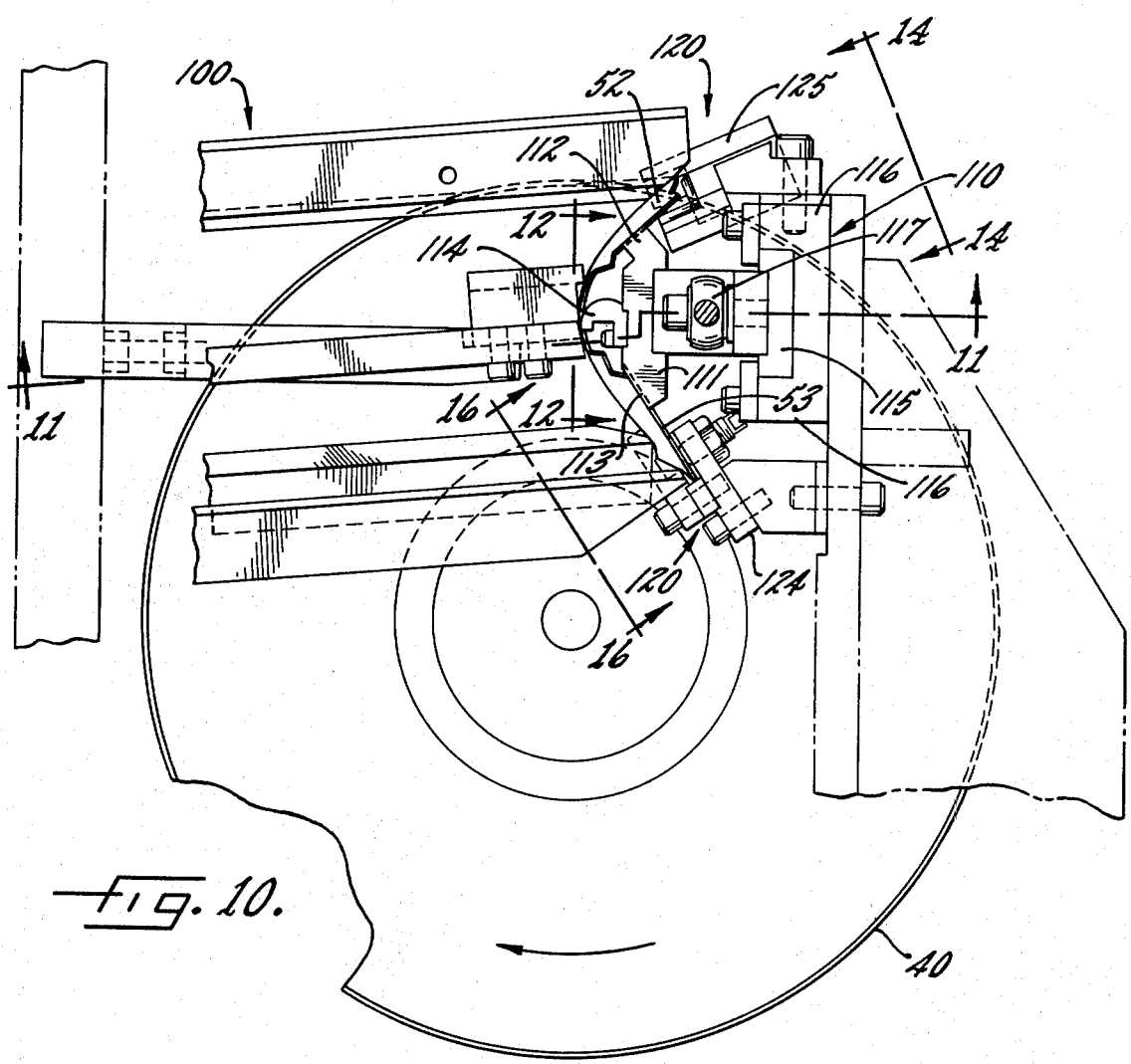
FIG. 10 is a fragmentary plan view showing in further detail the foil magazine and foil stripper mechanism.

In accordance with one of the important aspects of the invention, the foil 50 is guided along the stripper guides 120 and is thereby temporarily deformed for insertion into a preliminary assembly position in the drum 40. To accomplish this, and as best illustrated in FIGS. 10-16, as the stripper block 11 begins its downward motion, a foil 50 is stripped from the magazine 100 and is urged downward along the stripper guides 120 by the engagement pads 112, 113 and 114 (FIGS. 11-13). These guides 120 include an inboard guide 124 and an outboard guide 125 which converge slightly toward one another at their lower ends (FIG. 10). Thus, as the foil 50 moves downwardly toward the drum 40, it is forced, by the stripper guides 124 and 125, to deform or cup itself into a deformed shape wherein the wings 52 are drawn slightly toward each other about the rounded front engagement pad 114 of the stripper block which acts as a fulcrum or bending point.

Such cupping motion causes the outboard wing 52 and its appended ear 59a to be moved to a position inside the circumference of the drum 40, thereby positioning the ear 59a directly opposite its corresponding drum slot 41a when the foil 50 has been moved to the extreme lower end of the stripper guides 124 and 125, as illustrated in stop-action manner in FIG. 15.

As soon as the foil 50 has been inserted down into the drum 40 and has reached its preliminary position, the stripper block 111 is positively and upwardly withdrawn from the foil for a limited distance by the positive action of cam 122 and cam follower 121. This limited withdrawal allows the outboard wing 52 to spring toward the side of the drum 40, and the attached ear 59a to spring into its corresponding slot 41a.

For moving the foil 50 from its preliminary position to its final position and positively seating the foil within the drum 40, in accordance with another aspect of the invention, a hammer mechanism 130 is provided. In the illustrated embodiment, this hammer mechanism includes, as may be seen in FIGS. 18-20, a reciprocating hammer pin 131 mounted for translating motion upon a slide 132 carried in guides 133 which are in turn mounted upon the apparatus superstructure. The slide 132 and hammer pin 131 are moved toward and away from the preliminarily positioned foil 50 by a linkage including a bell crank 134, connecting link 135, rocker arm 136, and cam follower 137 which moves in response to a cam wheel 138 journaled upon the cam shaft 190. It will be noted, from FIG. 9, that motion of the cam follower 137 produces a corresponding rotary oscillating motion in the bell crank 134. To convert this rotary bell crank motion into linear motion in the slide 132, scotch gearing 138 is provided between the bell crank 134 and pin hammer slide 132.

For actively causing the positive striking motion of the hammer pin 131, a biasing means 139 is attached to the rocker arm 136. The positive or forward motion of the hammer pin 131 is caused by the biasing means 139. Thus, should this mechanism become jammed, the cam follower 137 will merely be held by the jammed parts away from the cam wheel 138, thereby preventing damage to the assembler.

To insure that the foil is properly and positively seated in its final assembly position with the drum, a cam surface 139a is provided upon the inboard end 124a of the inboard guide 124 (FIGS. 17). Progressive positional accuracy of the wing 53 of the foil 50 for insertion into the drum 40, is obtained by tapering the inboard guides 124 toward each other.

In accordance with yet another aspect of the invention, it is the function of the hammer pin 131 to strike the top of the inboard wing 53 so as to force that wing 53 in a direction radially outward of the drum 40 and also rotationally along the drum 40, and thereby to positively seat the inboard ears 59b, 59c and 59d in the corresponding slots 41b, 41c and 41d, as best seen in FIGS. 16 and 18.

After the foil 50 has been finally positioned within the drum 40, the hammer mechanism is withdrawn so that the drum 40 may be rotatably indexed about its axis to allow a succeeding foil 50 to be inserted therein-to. To accomplish this indexing motion, the index mechanism 140 seen particularly in FIGS. 23-26 is provided.

For engaging the drum and rotating it about both its axis and the coincident mandrel axis, an index pin 141 is moved in a generally rectangular path. During machine operation, the index pin 141 is first inserted into one of the outermost slots 41a in the drum, and then translated in a direction generally perpendicular to the inserting motion so as to rotate the drum upon the mandrel head 86 about the axis of the drum and mandrel. The pin is then extracted from the slot 41a and finally translatably returned to its first position for subsequent re-insertion into a succeeding slot 41a as may be noted upon reference to FIG. 23.

To position the index pin 141 in its drum engaging location, the pin 141 is secured as by a set screw, to a holder 142 which is resiliently mounted in a carrier 143, as seen in FIG. 26. The carrier 143 is, in turn, mounted upon a bridge 144 which is journaled for rotational and axial movement along a bridge shaft 145.

Axial motion of the bridge 144 along the index shaft 145 to produce the requisite indexing and pin return motion is caused by the motion of a cam follower 146 and its engagement with the face of a face cam 147 carried upon the cam shaft 190. The motion of the cam follower 146 is transmitted through a rocker arm 148 and a connecting link 149 to a stud 151 mounted upon the bridge 144. A positive-acting biasing means, here illustrated as a spring 152, is also secured to the bridge 144 for drawing the bridge and carrier index pin 141 in its positive indexing direction. Thus, should the machine become jammed, the cam follower 146 will simply remain retracted from engagement with the face cam 147 and the axial motion of the bridge 144 will not be produced.

Figure 24:
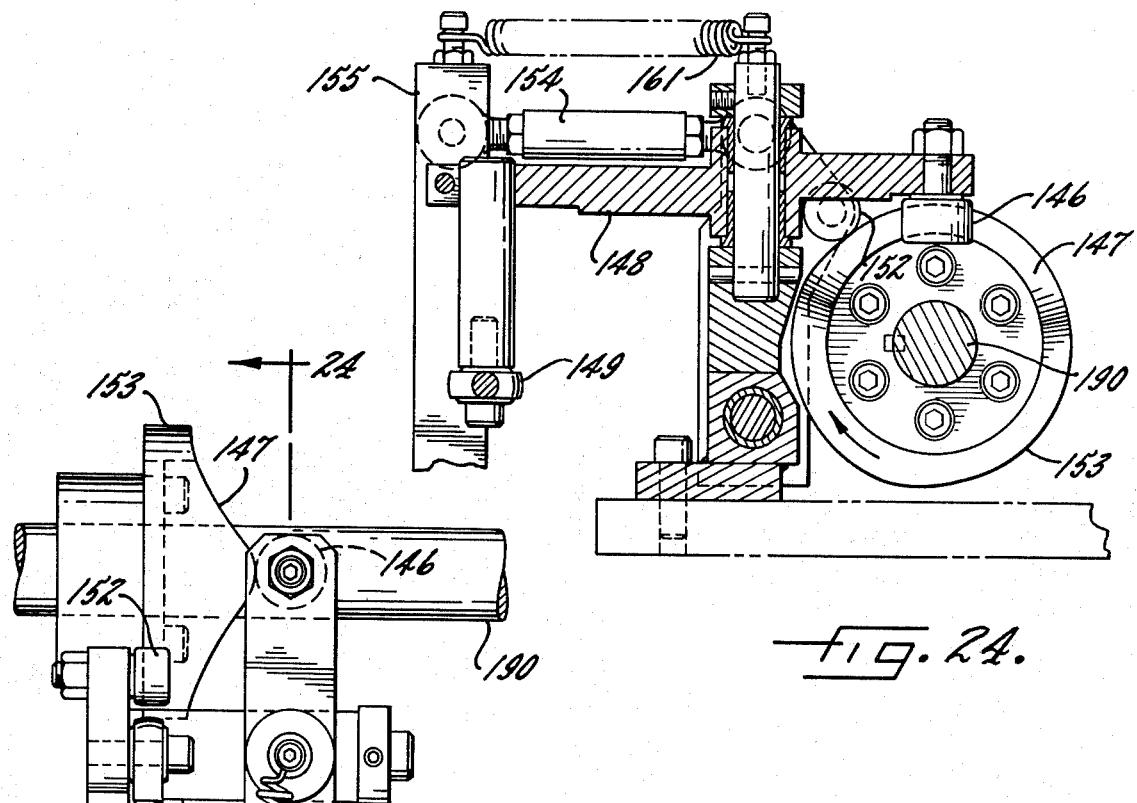
FIG. 24 is a sectional view taken substantially along the line 24—24 in FIG. 23 showing in detail the cam mechanism by which the illustrated drum indexing mechanism is actuated.
Figure 23:
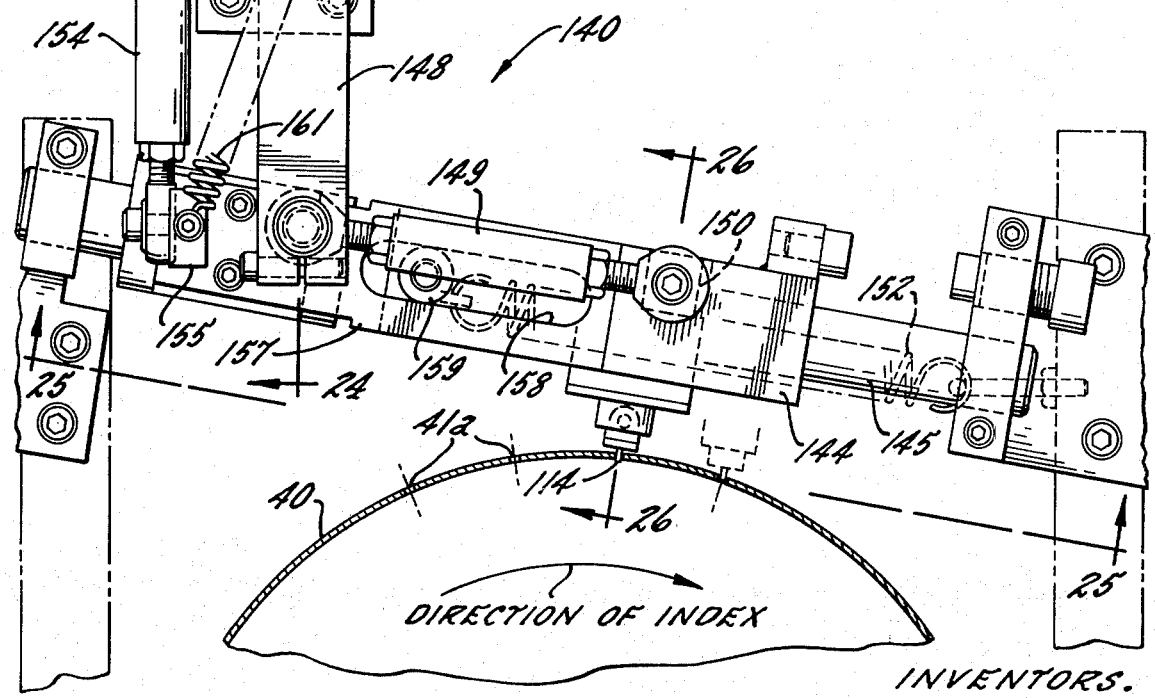
FIG. 23 is a fragmentary plan view showing in further detail the drum indexing mechanism.

Rotational motion of the bridge 144 about the bridge shaft 145 required to produce the requisite pin insertion and extraction motion in transmitted via a cam-driven linkage shown in FIGS. 23-25 and including a cam follower 152 which engages the surface of a cam 153, a connecting link 154, a finger 155, a separate rocking bearing 156, and a cam lever 157 having a female cam surface 158 mounted or formed thereon. An offset cam follower 159, attached to the bridge 144, directly causes rotational inserting and extracting motion of the bridge 144 and the index pin 141 carried thereon. Again, a biasing means such as a spring 161 is provided to cause the positive insertion motion of the index pin 141 into the drum 40; the cam and follower linkage 152-155 are arranged to provide the extracting motion. Should the device become jammed, the parts will remain in the extracted position and will not move against the positive urging of the resilient spring or biasing means 161.

Figure 27:
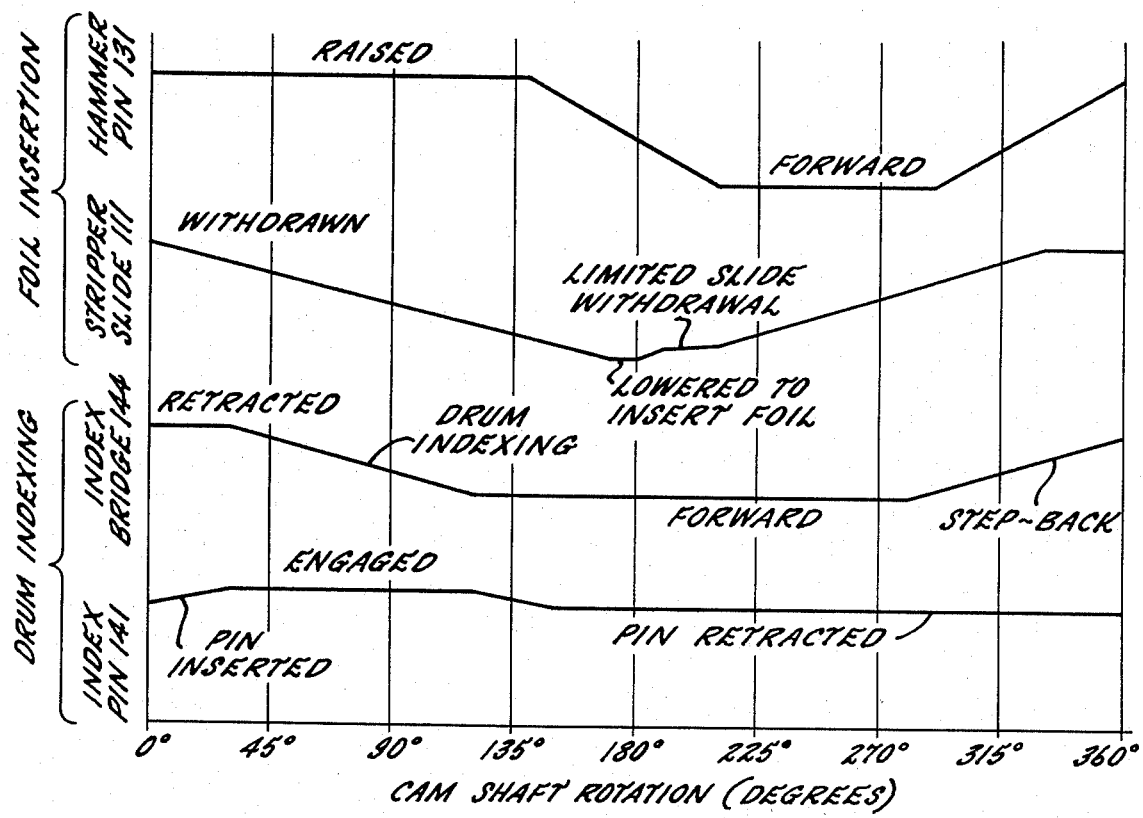

Synchronous motion of the above-described parts is required to achieve the desired automatic assembly of the foils in the drum. This synchronous motion is achieved by means of the cams carried upon the cam shaft 190 in a manner particularly indicated in FIG. 27. At an initial point, the stripper slide 111 begins to strip the foil 50 from the magazine 100 and force the foil into its preliminary insert position with the drum 40. As the stripper slide 111 nears its preliminary insert position, the hammer pin 131 is urged forward toward the foil. To retain the preliminarily inserted foil in the proper position for striking engagement by the hammer pin 131, the stripper slide 111 is then partially withdrawn to a holding position. The hammer pin 131 then strikes the foil 50 and forces it from its preliminary into its final position, and remains engaged with the foil 30 while the stripper slide 111 is fully withdrawn, thereby preventing accidental subsequent dislodgement. Simultaneously with the initial downward motion of the stripper slide, the index pin 141 is inserted into a slot 41a in the drum 40 and moved axially along the index shaft 145, thereby rotatably indexing the drum 40 to receive the descending foil.

Figure 7:
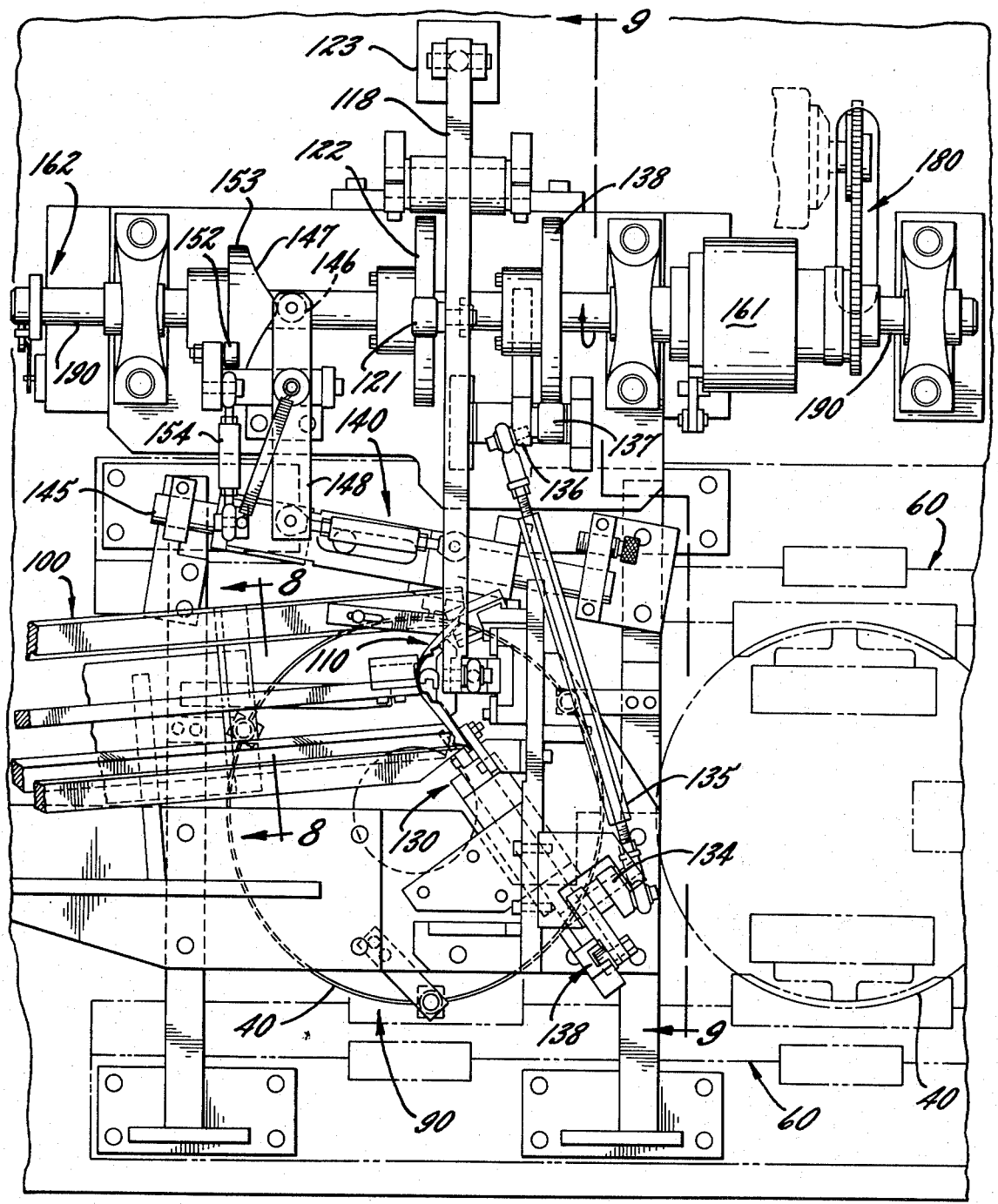
FIG. 7 is a partial plan view of the drum indexing and foil assembling mechanisms of the assembly machine.

After a complete set of foils have been assembled in the drum, an empty drum is exchanged for the full or completed drum assembly at the work position 90. The appropriate timing for this exchange is determined by a counter 162 (see FIG. 7) which counts the number of indexing and insertion motions made by the cam operated devices. To disengage the cam actuated devices from the continuously rotating motor 170 and drive train 180 while drums are being exchanged at the work position 90, a clutch 161 is provided. When a foil has been inserted in each of the foil receiving positions within the drum and the drum has been angularly indexed through a full revolution upon the rotatable mandrel 80, the mandrel 80 is automatically retracted, thereby lowering the drum 40 from its work position 90 to its preliminary position 70 upon the waiting rack 60. The rack 60 is then indexed to the left, as seen in FIG. 4, and the now-filled drum is thereby carried to the left for engagement by stops 163 and 164 (see FIGS. 4 and 5) while a new drum is simultaneously moved into the preliminary position 70. Thereafter, the mandrel 80 is again projected to raise the new drum 40 to the work position 90 and the rack 60 is again indexed to the right to a position ready to receive another empty drum. As the rack is returned to the right the stops 163 and 164 engage the drum 40 and prevent its motion with the rack. The rack 60 is thus withdrawn from underneath the completed drum 40 and the drum is allowed to fall upon the rails 160 fro movement away from the assembler to another work station or pickup point.

I claim as my invention:

1. The method of assembling curved workpieces in a curved support structure comprising the steps of:
    a. positioning the support structure in a work station;
    b. stripping a stacked workpiece from a magazine;
    c. moving the workpiece toward the support structure;
    d. resiliently deforming the workpiece for insertion into the support structure; and
    e. inserting the deformed workpiece into the support structure.
2. The method set forth in claim 1, including:
    f. causing the workpiece to spring back toward its undeformed shape as the workpiece is preliminarily inserted into the support structure.
3. The method as set forth in claim 1, wherein the workpiece is simultaneously deformed for insertion into the support structure as it is moved toward the support structure.
4. A method of inserting a curvilinear winged and eared fluid foil into a drum member, including the steps of:
    a. engaging the foil stacked in a magazine by a stripper member at a plurality of locations;
    b. stripping the foil from the magazine by moving the stripper at an angle to the axis of the magazine;
    c. deforming the foil for insertion into the drum, while simultaneously moving the foil toward the drum;
    d. preliminarily positioning the foil in the drum member;
    e. allowing the foil to return toward its undeformed state;
    f. partially retracting the stripper from engagement with the preliminarily inserted foil;
    g. hammering the foil into a finally assembled position in the drum member; and
    h. rotating the drum to a subsequent assembly position to receive a subsequently inserted foil.
5. A method according to claim 4, including the steps of engaging the foil by guides and deforming the foil by cupping the foil wings about a fulcrum on the stripper.
6. A method according to claim 5, including the step of inserting a first foil ear into the drum as the foil is allowed to return toward its undeformed state.
7. A method according to claim 4, including the step of retaining subsequent foils in the magazine as the stripper urges said foil toward the said drum.
8. A method according to claim 4 including the step of hammering the inboard wing of the foil in a direction radially outwardly and rotationally along the drum.
9. A method according to claim 8 including the step of linearly translating the hammer mechanism into engagement with the foil.
10. An apparatus for assembling cuvilinear fluid foils into a foil support structure disposed in a work station, the combination of:
    stripper means for engaging said foil at a plurality of locations and urging the foil toward the foil support structure; and
    guide means for guiding the foil along a predetermined path leading to the foil support structure;
    said stripper means and said guide means acting upon the foil to resiliently and temporarily deform the foil for assembly into the foil support structure in a preliminary position.
11. Apparatus as defined claim 10 wherein said stripper means is provided with a plurality of foil engagement means for engaging the foil and urging it along the guide means and at least one engagement means for providing a fulcrum about which the foil may be temporarily bent or sprung.
12. Apparatus as defined in claim 10 including cam means located on said guide means, said cam means shaped to permit the foil to spring back toward the prior undeformed foil shape as the foil moves into its preliminary assembly position.

13. Apparatus as defined to claim 10 including foil magazine means for storing a plurality of the foils in stacked, nested relationship, said magazine means having a discharge end, said stripper means engaging the outermost one only of said foils for stripping the foil from said magazine means at a plurality of points and urging the foil toward the foil support structure, the guide means being mounted adjacent the discharge end of said magazine for engaging said foil immediately upon its removal from said magazine by said stripper means.

14. Apparatus according to claim 10 including retaining means for retaining said foils in said magazine when said striper means is not stripping a foil from said magazine, said retaining means being positioned out of the path of motion of said stripper means.

15. Apparatus for assembling curvilinear winged and eared fluid foils into a foil support structure disposed in a work station, comprising, in combination:

a. means for supporting said foil support structure in said work station in an initial foil receiving position;

b. means for supporting a plurality of fluid foils in stacked relation;

c. stripper means for stripping foils one at a time from said support means and moving the stripper foil toward said foil support structure;

d. guide means for guiding each stripped foil one at a time into a predetermined preliminary, temporarily deformed assembly position within said foil support structure;

e. hammer means linearly translatable for urging said preliminarily assembled foil into a final assembly position in said foil support structure; and, f. indexing means for indexing said foil support structure from said initial foil receiving position into a new foil receiving position after each foil has been finally inserted into said structure.

16. Apparatus according to claim 15 wherein said guide means includes guide members for resiliently and temporarily deforming the foil as the foil is moved toward the foil support structure.

17. Apparatus according to claim 15 wherein said hammer means is positioned for engaging an inboard wing of said foil and for urging said wing and said foil in a direction redially outwardly of and rotationally along and axially into said foil support structure into a final assembly position.

* * * * *